(12) United States Patent
Jerrard-Dunne

(10) Patent No.: US 10,904,355 B1
(45) Date of Patent: Jan. 26, 2021

(54) ENTERPRISE WORKSPACES

(71) Applicant: INTERNATIONAL BUSINESS MACHINES CORPORATION, Armonk, NY (US)

(72) Inventor: Stanley Kieran Jerrard-Dunne, Dublin (IE)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/523,169

(22) Filed: Jul. 26, 2019

(51) Int. Cl.
- G06F 15/16 (2006.01)
- H04L 29/08 (2006.01)
- H04L 29/06 (2006.01)
- G06F 9/445 (2018.01)

(52) U.S. Cl.
CPC .......... H04L 67/306 (2013.01); G06F 9/4451 (2013.01); H04L 63/08 (2013.01); H04L 63/308 (2013.01)

(58) Field of Classification Search
CPC ..... H04L 67/306; H04L 63/08; H04L 63/308; G06F 9/4451
USPC ........................................................ 709/217
See application file for complete search history.

(56) References Cited

U.S. PATENT DOCUMENTS

| | | | |
|---|---|---|---|
| 6,324,683 B1 | 11/2001 | Fuh | |
| 9,569,596 B2 | 2/2017 | Marcus | |
| 10,037,199 B2 | 7/2018 | Hung | |
| 10,073,679 B2 | 9/2018 | Straub | |
| 2015/0058960 A1 | 2/2015 | Schmoyer | |
| 2016/0342504 A1 | 11/2016 | Beskrovny | |
| 2017/0289128 A1 | 10/2017 | Kelley | |
| 2017/0364330 A1 | 12/2017 | Cheung | |

FOREIGN PATENT DOCUMENTS

WO 2007039873 A3 4/2007

OTHER PUBLICATIONS

IBM, List of IBM Patents or Patent Applications Treated as Related, Appendix P, dated Jul. 27, 2019, 2 pages.
Pending U.S. Appl. No. 16/523,152, filed Jul. 26, 2019, entitled: "Enterprise Workspaces".
Pending U.S. Appl. No. 16/523,197, filed Jul. 26, 2019, entitled: "Enterprise Workspaces".

*Primary Examiner* — Wing F Chan
*Assistant Examiner* — Joseph R Maniwang
(74) *Attorney, Agent, or Firm* — Kristofer L. Haggerty

(57) ABSTRACT

Concepts for associating an enterprise workspace user account with a service user account of a service are presented. One such concept comprises associating an identifier with service data provided by the service to the enterprise workspace, the service data being provided via a service authorization for a service user account. The identifier is provided to a user associated with the enterprise workspace user account. Responsive to the enterprise workspace user account executing a predetermined function with the identifier as a parameter of the function, the service data associated with the identifier is identified, and the service authorization the service data was provided via is determined. The enterprise workspace user account is then associated with the service user account that the service authorization is for.

17 Claims, 6 Drawing Sheets

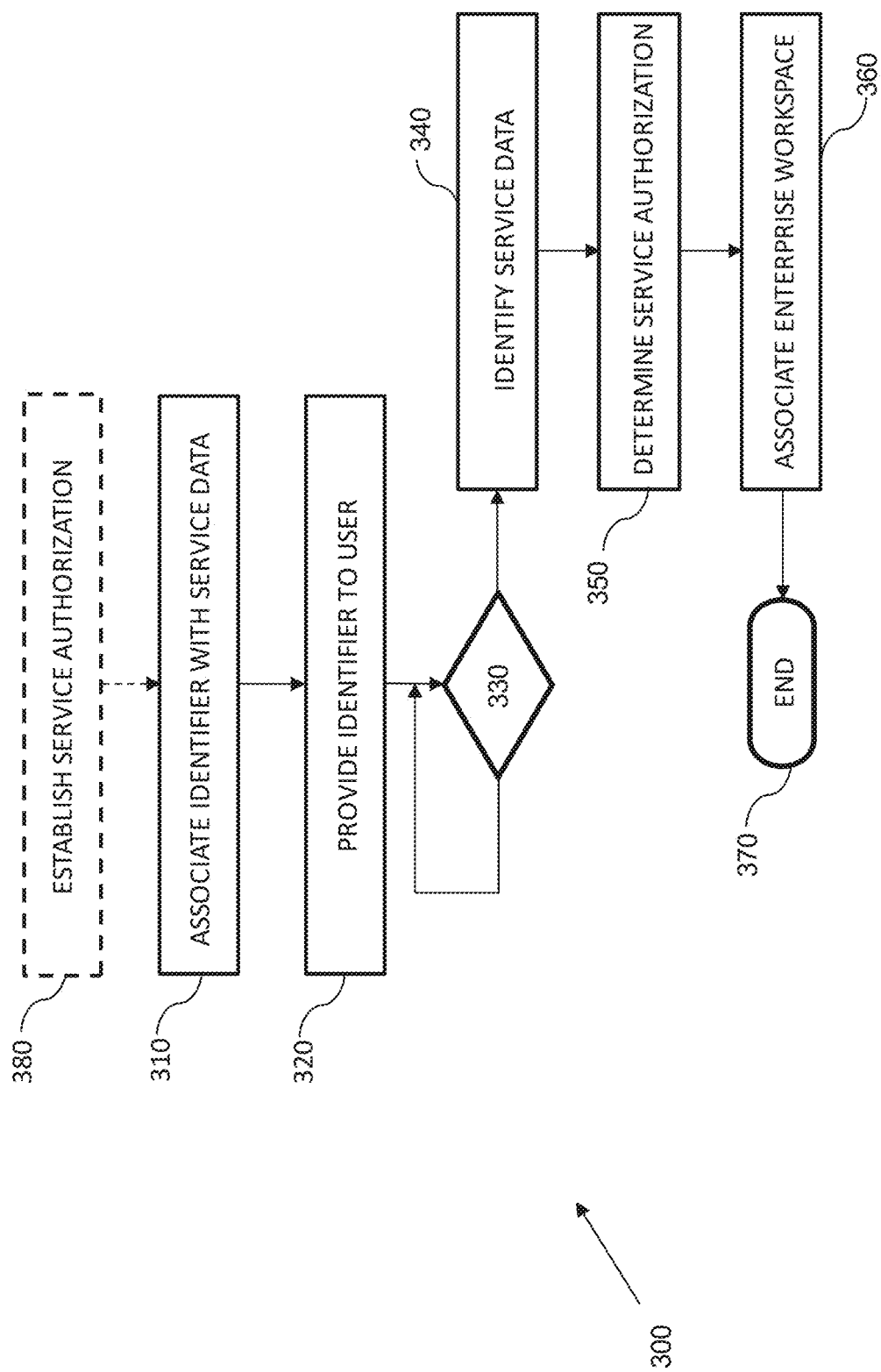

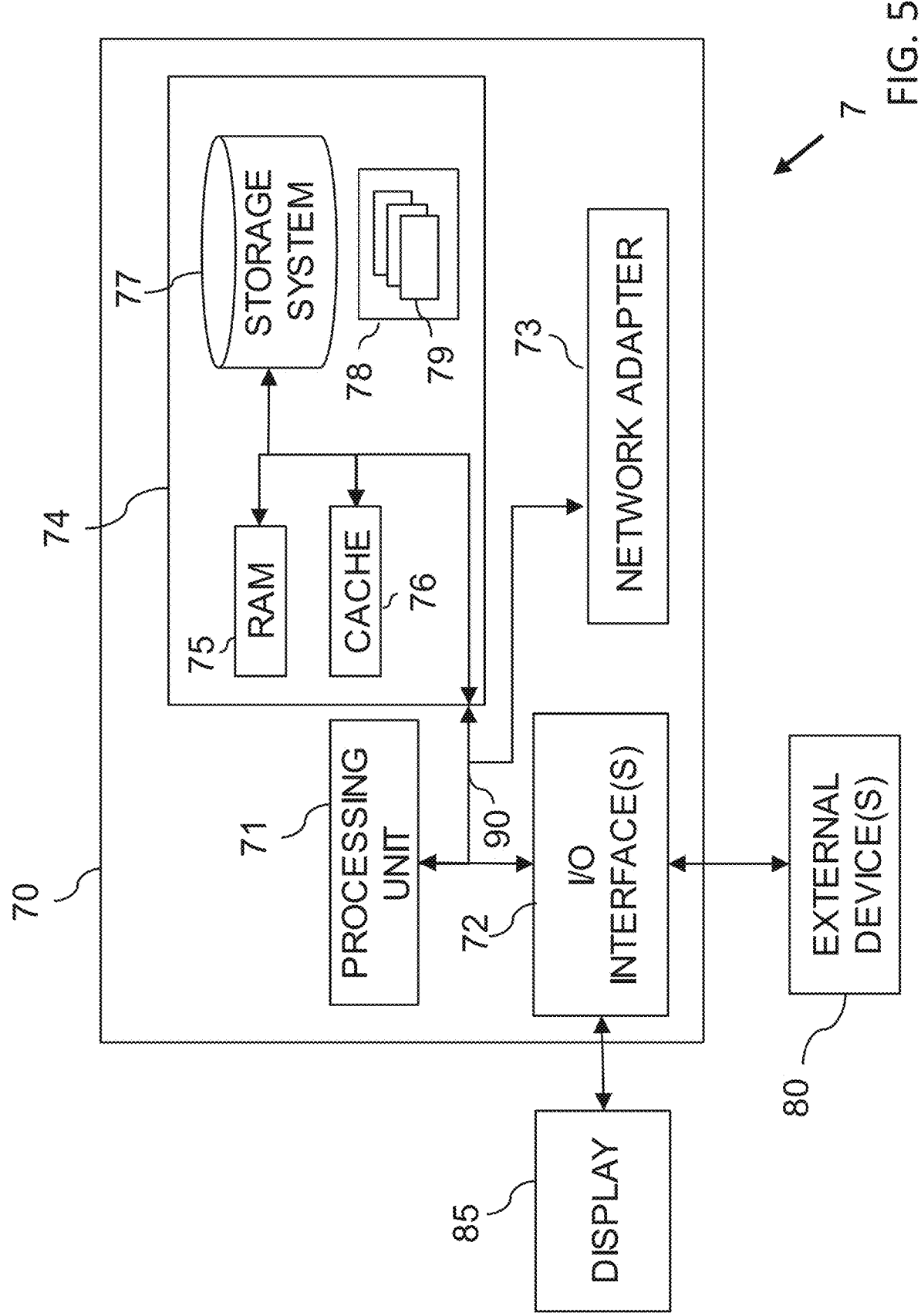

ENTERPRISE WORKSPACES

BACKGROUND

The present invention relates generally to the field of enterprise workspaces, and more particularly to associating an enterprise workspace account with a service account.

The present invention also relates to a computer program product comprising computer-readable program code that enables a processor of a system, or a number of processors of a network, to implement such a method.

The present invention further relates to a computer system comprising at least one processor and such a computer program product, wherein the at least one processor is adapted to execute the computer-readable program code of said computer program product.

The present invention also relates to a system for associating an enterprise workspace account with a service account.

It is known to provide an enterprise workspace in computing devices/networks, so that an operating system can separate components and data in the enterprise workspace from components and data in a personal workspace. In addition, components can monitor, control, and restrict activity in the enterprise workspace without having to monitor, control, or restrict activity in the personal workspace. For such reasons, enterprise workspaces are commonly provided by companies for use by employees. For example, an employee can use his/her personal computing device to access an enterprise workspace provided by his/her employer and undertake work activities, whilst the enterprise workspace monitors, controls, and/or restricts activity in the enterprise workspace (so as to maintain security for example).

An enterprise workspace will typically require a user to create a user account with the distributor of the enterprise workspace. In this way, a user will typically have an enterprise workspace account associating the user with the enterprise workspace. The enterprise workspace account may, for example, be used to configure the enterprise workspace for the associated user.

Network service platforms are designed for allowing people to access and/or share information through the internet. Nowadays, many network service platforms that provide services (e.g. applications and programs) have been very well developed. However, conventional services of network service platforms typically require a user to firstly complete a registration process before logging into the network service. After the registration process is completed, the user will have an associated service user account that he/she uses to log into the service (e.g. to acquire or use the services and functions provided by service platforms).

Enterprise workspace applications which intercept activity within a workspace are known, and such applications typically use a well-known webhook mechanism. Such webhook mechanisms are well-known with network service platforms, and thus enable an enterprise workspace application to work with a service of a network service platform.

However, a user's identity for an enterprise workspace account may not be the same as the user's identify for a service of a network service platform. This can prevent an enterprise workspace application for the user from being authorized to access the service.

SUMMARY

The present invention seeks to provide a computer-implemented method for associating an enterprise workspace user account to a service user account of a service.

The present invention further seeks to provide a computer program product including computer program code for implementing a proposed method when executed by a processing unit.

The present invention also seeks to provide a processing system adapted to execute this computer program code.

The present invention also seeks to provide a system for associating an enterprise workspace user account with a service user account of a service.

According to an aspect of the invention, there is provided a computer-implemented method for associating an enterprise workspace user account with a service user account of a service. The method comprises associating an identifier with service data provided by the service to the enterprise workspace, the service data being provided via a service authorization for a service user account. The method also comprises providing the identifier to a user associated with the enterprise workspace user account. The method further comprises, responsive to the enterprise workspace user account executing a predetermined function with the identifier as a parameter of the function: identifying the service data associated with the identifier; determining the service authorization the service data was provided via; and associating the enterprise workspace user account with the service user account that the service authorization is for.

According to another aspect of the invention, there is provided a computer program product for associating an enterprise workspace user account with a service user account of a service. The computer program product comprises a computer readable storage medium having program instructions embodied therewith, the program instructions executable by a processing unit to cause the processing unit to perform a method according to a proposed embodiment.

According to another aspect of the invention, there is provided a computer system comprising at least one processor and the computer program product according to an embodiment. The at least one processor is adapted to execute the computer program code of said computer program product.

According to another aspect of the invention, there is provided a system for associating an enterprise workspace user account with a service user account of a service. The system comprises an identification component configured to associate an identifier with service data provided by the service to the enterprise workspace, the service data being provided via a service authorization for a service user account. The system also comprises an interface component configured to provide the identifier to a user associated with the enterprise workspace user account. The system further comprises a registration component configured to, responsive to the enterprise workspace user account executing a predetermined function with the identifier as a parameter of the function: identify the service data associated with the identifier; determine the service authorization the service data was provided via; and associate the enterprise workspace user account with the service user account that the service authorization is for.

BRIEF DESCRIPTION OF THE DRAWINGS

Preferred embodiments of the present invention will now be described, by way of example only, with reference to the following drawings, in which:

FIG. 3 is a simplified flow diagram of a computer-implemented method for associating an enterprise workspace user account with a service user account of a service according to an proposed embodiment;

FIG. 5 illustrates a system according to another embodiment.

DETAILED DESCRIPTION

Figure 1:
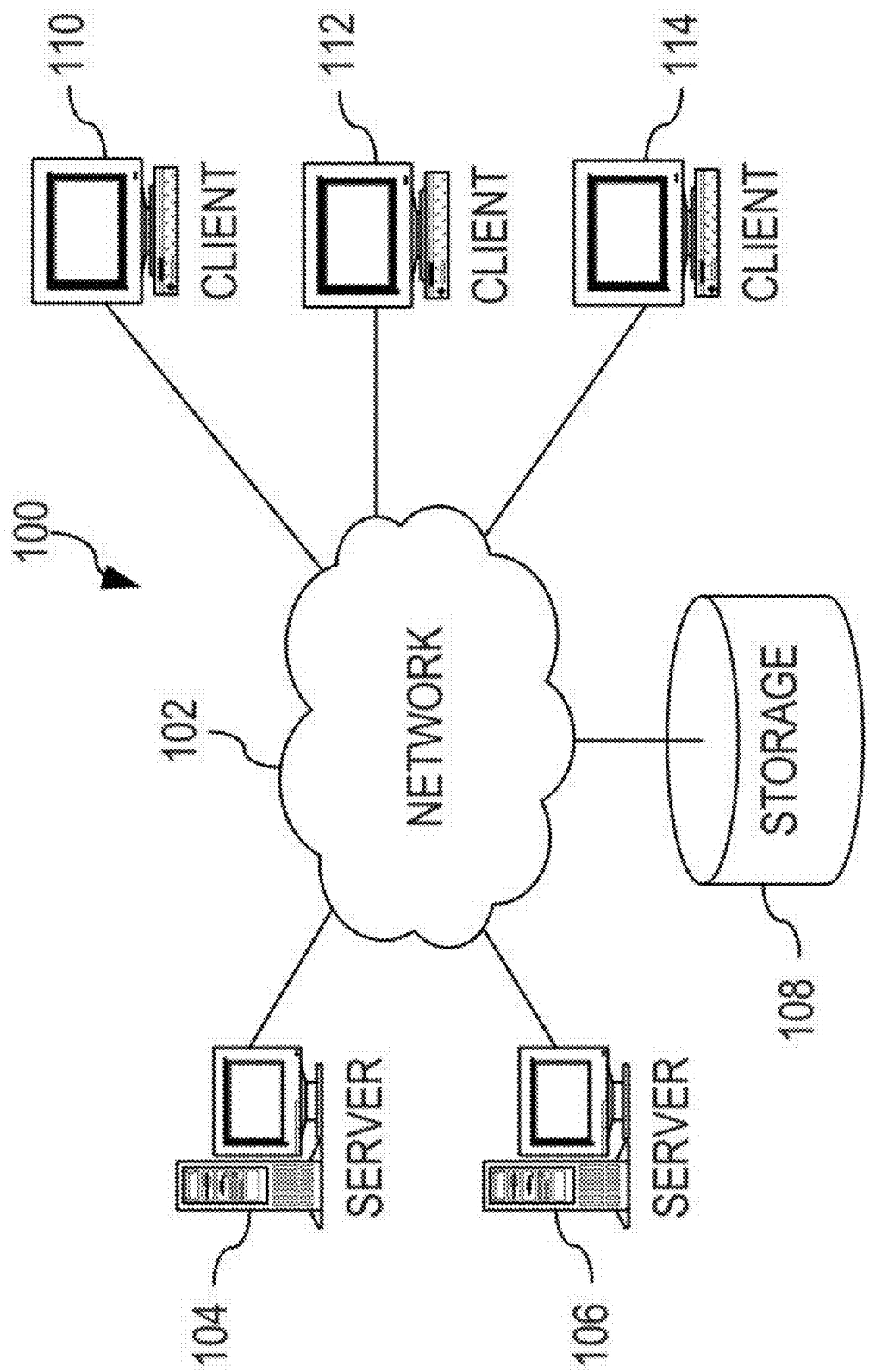
FIG. 1 depicts a pictorial representation of an example distributed system in which aspects of the illustrative embodiments may be implemented.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Proposed are concepts for linking a user's differing identities that are employed for an enterprise workspace account and a service user account. Such concepts may link the identities in a secure and flexible way.

By linking a user's differing identities, the user's enterprise workspace user account may be associated with the user's service user account. Thus, where the enterprise workspace has been authorized to access data of a third party service (e.g. by previously establishing a service authorization for the service user account), the third party service authorization may be linked/associated with the enterprise workspace user account. In this way, the user's enterprise workspace user account may be allowed to call Application Programming Interfaces (APIs) and access functionality of the third party service.

Proposed embodiments may thus provide a method and/or system for linking an enterprise workspace user account (i.e. a workspace user identity) with/to a service user account (i.e. a service user identity) that is authorized to use a service. Such linking (or associating) may be implemented in a secure and flexible manner Such embodiments may also allow delegation of the execution of user-submitted code under authority of the linked user.

Embodiments may therefore provide a tool for associating an enterprise workspace user account with a service user account of a third party service, thus enabling a the user to call APIs and access functionality of the third party service via the enterprise workspace.

For the avoidance of doubt, reference to an enterprise workspace is to be taken to refer to a workspace provided (by a distributor, controller, organization, etc.) in computing devices/networks which may have components and data that are separated from components and data of another (e.g. personal) workspace. Enterprise workspaces are commonly provided by companies for use by employees so that the employees can use their personal computing device(s) to access the enterprise workspace and undertake work activities. An example of such a workspace may, for instance, comprise a Slack™ channel accessed via a Slack™ client.

Also, reference to service is to be taken to refer to a service provided by a service network platform and accessible via the Internet. A service network platform may, for example, be provided by an external, third party that is independent or different from the provider of the enterprise workspace. Services are commonly designed and provided so as to enable users to access and/or share information through the internet, and they typically require a user to register with the service so as to establish a service user account (having an associated identity) with one more corresponding service configurations and authorizations. An exemplary service may, for instance, provide an email service provider by a third party organization. Another example may be a Google® Application Programming Interface which may for example be used to enable a user to send email directly from a workspace.

Embodiments may associate a unique identifier with service data provided via a service authorization for a service user account. The user having the service user account may be provided with the unique identifier, and he/she may then provide this unique identifier (e.g. as a parameter of the function) in order to register (i.e. link) his/her workspace user account to the service user account that is authorized to use the service. Such embodiments may employ a concept that the unique identifier can be used to authenticate the workspace user account and also identify the relevant service authorization that is to be associated (i.e. linked) with the workspace user account.

Although in some embodiments, the service authorization (allowing access to data of the service for the service user account) may have already been established (e.g. via a previously undertaken authorization process), some embodiments may further comprise the step of establishing a service authorization for a service user account. Accordingly, some embodiments may be configured to facilitate both a service authorization process and a process of associating the service authorization to a workspace user account.

By way of example, establishing a service authorization for a service user account may comprise: defining an oauth profile for the service user account; and, based on the oauth profile, defining a service authorization that is configured to authorize the enterprise workspace to access data of the service for the service user account. In this way, embodiments may support known authorization concepts and procedures, thus facilitating usage with existing/conventional services and service network platforms.

The identifier may be configured to only be valid for a predetermined time period. Put another way, the identifier may be a time-sensitive or time-limited token that has a restricted or limited time period during which it can be used. This may help to ensure that the identifier can only be used by the intended user, e.g. by being invalidated if it is not used soon after delivery to the user and thus reducing a risk that it is passed to (or acquired by) another user.

For instance, responsive to the identifier not being used in the predetermined function within the predetermined time period, embodiments may disassociate the identifier with the service data (i.e. deactivate or invalidate the identifier) and then associate a second, different identifier with the service data. This second identifier may then be provided to the user associated with the enterprise workspace user account. In this way, the identifier may be regularly refreshed, the preventing an old, un-used identifier being used by an unintended/unauthorized user.

Also, in some embodiments, the identifier may be configured to be valid for only a single use as a parameter of the predetermined function. Again, this may help to ensure that the identifier can only be used by the intended user, e.g. by being invalidated once it has been used and thus reducing a risk that is used by another user at a later time.

The predetermined function may comprise a registration function configured to receive an identifier as a parameter and, responsive to being executed by an enterprise workspace user account, to associate the enterprise workspace user account with a service user account based on an identifier received as a parameter. For example, the function may comprise a "marryme" function, and be expressed as follows "marryme(identifier)" wherein the identifier is provided as the parameter of the marryme function.

By way of example, in embodiments, the service may comprise a service of a network service platform accessible via the Internet. The service may therefore comprise a third party service that is external to the provider/distributor of the enterprise workspace. Embodiments may therefore link a third party authorization with an enterprise workspace account, thus allowing a user to call APIs and access functionality of the third party service that are independent from the provider/distributor of the enterprise workspace.

FIG. 1 depicts a pictorial representation of an exemplary distributed system in which aspects of the illustrative embodiments may be implemented. A distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
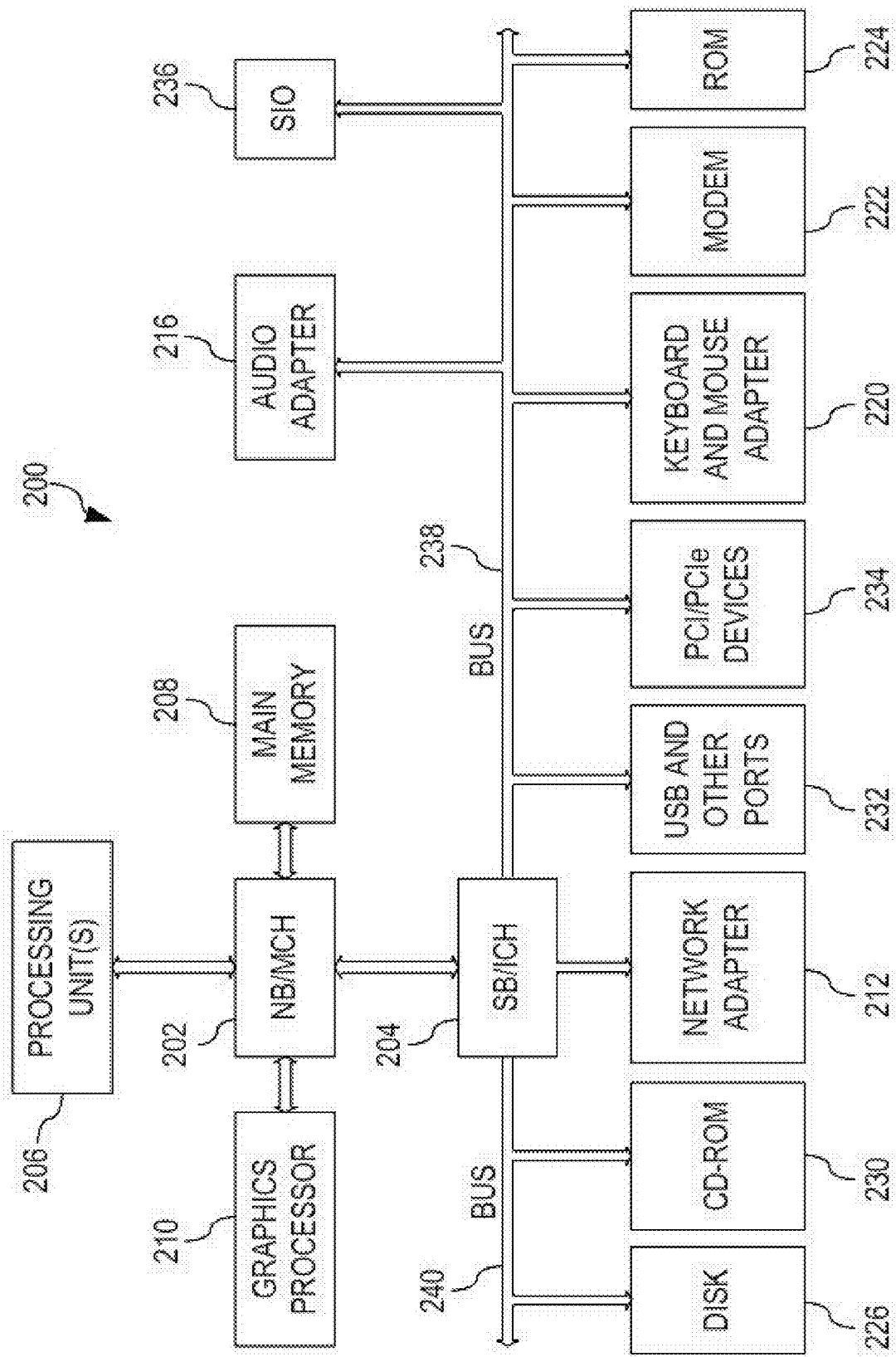
FIG. 2 is a block diagram of an example system in which aspects of the illustrative embodiments may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) port and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System p computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed. IBM, eServer and AIX are trademarks of International Business Machines Corporation in the United States and/or other countries. Linux is a registered trademark of Linus Torvalds in the United States, other countries, or both.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

As detailed above, proposed embodiments provide a method and system for associating an enterprise workspace user account with a service user account of a service. Such embodiments may associate an identifier with service data provided by the service to the enterprise workspace via a service authorization for a service user account. The identifier may be used by the user linked to the service user account so as to link (i.e. associate) the user's enterprise workspace user account with the service user account. In particular, the user may process the identifier with a registration function, and the identifier may be used by the registration function to identify and link the service user account.

Referring now to FIG. 3, an exemplary embodiment of a method 300 for associating an enterprise workspace user account with a service user account of a service will be described. In this example, the service is a service of a network service platform accessible via the Internet, and the enterprise workspace is a workspace provided/distributed by a company to it employees.

Step 310 comprises associating an identifier with service data provided by the service to the enterprise workspace. Here, the service data is provided via a service authorization for a service user account. Accordingly, in this example, the service authorization has been previously established and is configured to authorize the enterprise workspace to access data of the service for the service user account In this example, the identifier is a unique identifier comprising a string of alphanumeric characters. Furthermore, the identifier is configured to only be valid for a predetermined time period (e.g. ten minutes, one hour, one day, etc.) and also only valid for a single use. In this way, the identifier is a time-sensitive (or time-limited) token that has a restricted or limited time period during which it can be used, and once it has been used, it is invalidated and cannot be used again.

In step 320, the identifier is provided to the user associated with the enterprise workspace user account. This may, for example, be done by displaying the identifier to user via a user interface of the enterprise workspace and/or by sending the identifier to the user via an electronic message (e.g. in an email, SMS, or messaging application message).

In step 330, the method checks whether a predetermined function is executed in the enterprise workspace. In this example, the predetermined function comprises a registration function that is configured to receive an identifier as a parameter. By way of example, the registration function in this embodiment comprises a "marryme" function and is expressed as follows "marryme(identifier)".

If the registration function is not executed, the method returns to step 330 and undertakes the check once again. Conversely, if the registration function is executed in the enterprise workspace, the method proceeds to step 340. In this way, the method repeatedly and continuously checks for execution of the predetermined registration function and only proceeds to step 340 responsive to the enterprise workspace user account executing the predetermined registration function.

In step 340, the service data associated with the identifier included in the registration function is identified. Then, in step 350, the service authorization that the service data was provided via is identified and the method proceeds to step 360. Step 360 comprises associating the enterprise workspace user account with the service user account that the identified service authorization is for.

The method then proceeds to step 370 wherein it ends (i.e. the method 300 is terminated/finished).

Although in the above example embodiment the service authorization has been previously established, it is to be understood that other embodiments may comprise the preceding step (380) of establishing a service authorization for a service user account, the service authorization being configured to authorize the enterprise workspace to access data of the service for the service user account. Simply by way of illustration, this step is depicted in FIG. 3 using dashed lines.

For example, the step 380 of establishing a service authorization for a service user account may comprise: defining an 'oauth profile' for the service user account; and based on the oauth profile, defining a service authorization that is configured to authorize the enterprise workspace to access data of the service for the service user account. Oath profiles are widely known and used in conventional authorization concepts and procedures. Accordingly, detailed description of such oauth profiles and their usage is omitted.

To aid further understanding and appreciation of the proposed concept(s), an exemplary implementation will now be described. Such an implementation is purely by way of demonstrating process steps and algorithms that may be employed, and it should be understood that other implementations are not limited to such process steps and algorithms only. Indeed, the skilled person will appreciate the other process steps and/algorithms may be employed to undertake and/or provide similar aspects of the proposed concept(s).

We begin description of an exemplary implementation by considering an application that provides end user programming capabilities within an enterprise workspace. Such an application is implemented as an enterprise workspace connected application that intercepts activity within a space through a well-known 'webhook' mechanism. Such webhook mechanisms are well known and can be implemented with third-party vendors of services (such as Slack™ and Google® Messaging). It can therefore be assumed that the application is easily adapted to work with these services.

The application supports the definition of oauth profiles through a function oauthprofile, for example, oauth profile for a Google® api may be as follows:
=oauthprofile(
"google",
www.googlepis.com
"10512345396-m435m5linn8tm1abcdefghjikjo.apps.googleusercontent.com",
"10512345396-m435m5linn8tm1abcdefghjikjo.apps.googleusercontent.com",
"iwUahgkhgkjsafkjsag_Gnqtqp",
"https://accounts.google.com/o/oauth2/auth?scope=https%3A%2F%2Fmail.google.com%2F&access_type=offline&prompt=consent",
"https://accounts.google.com/o/oauth2/token",
"google","public"
)

Having defined the oauth profile above, a user can authenticate to the service via a user interface (UI) provided by the application. Such an exemplary UI 400 is depicted in FIG. 4.

Figure 4A:
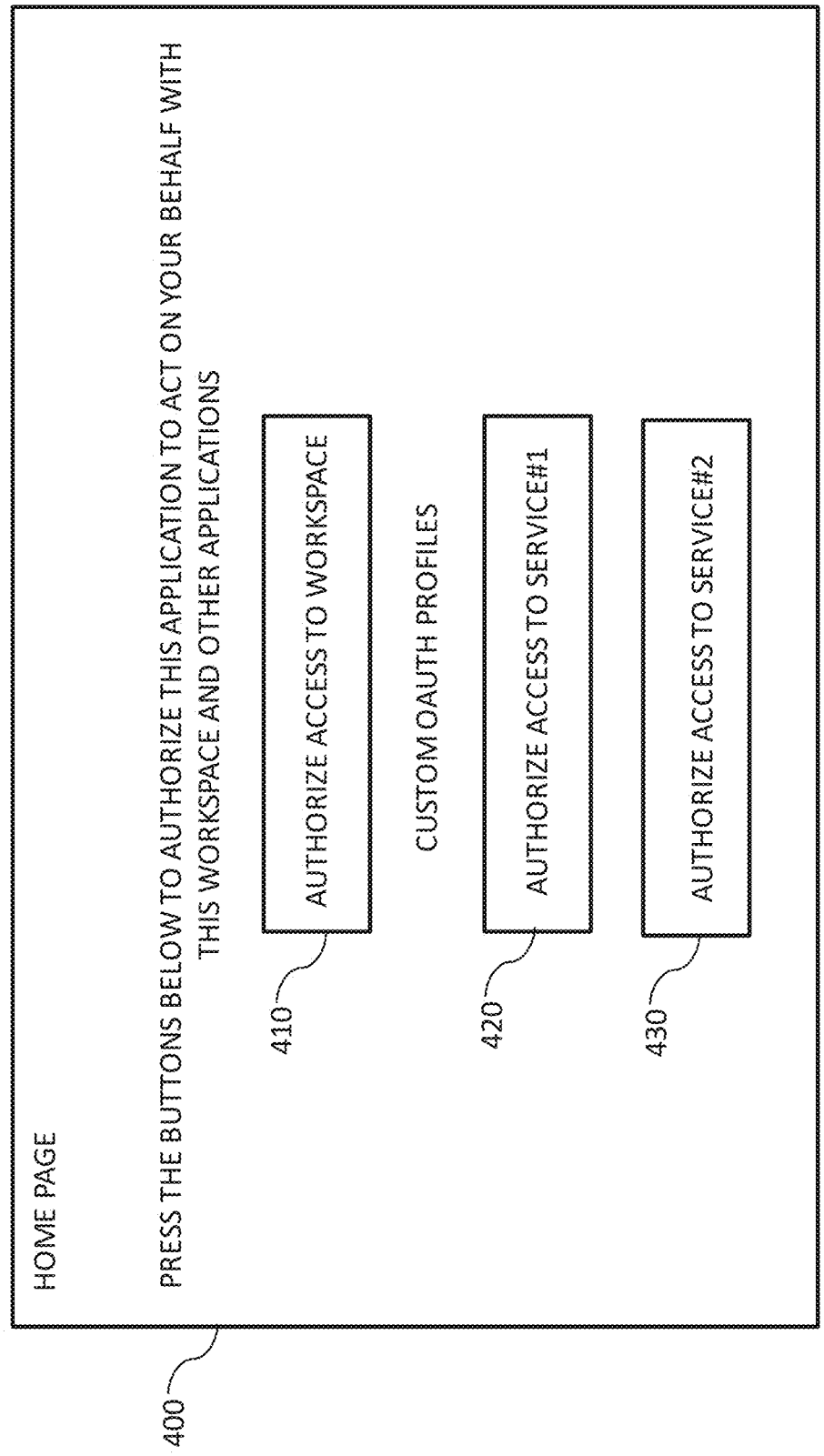
FIG. 4A-4B depict pictorial representations of an exemplary user interface provided by an application of an enterprise workspace for which an embodiment of the invention may be employed.

From FIG. 4A, it can be seen that the UI 400 includes a plurality of interactive UI elements (e.g. graphical buttons) 410, 420, 430.

The first UI element 410 is configured to authorize access to the enterprise workspace when activated (e.g. selected, clicked or pressed).

The second UI element 420 is configured to authorize the application to access a first service (Service #1) when activated (e.g. selected, clicked or pressed). In this example, the first service is the Google® service that uses the oauth profile above.

The third UI element 430 is configured to authorize the application to access a second service (Service #2) when activated (e.g. selected, clicked or pressed).

In this exemplary implementation, a problem faced is that the workspace identity (i.e. the identifier used for the user's enterprise workspace user account) is different from service identity (i.e. the identifier used for the user's service user account) used by the service being authorized. For instance, in the workspace, the user's identity is for the account registered with the provider of the workspace (e g name "Joe Bloggs" with an id like "internal-dc35a0c3-45ff-4x5b-835b-caac1234598b3b"), whereas, for the Google®, the user's identity is an email address (e.g. joebloggs@gmail.com).

This exemplary implementation is therefore configured to provide a way to link the identities in a secure and flexible manner.

Having authenticated to the third party service (i.e. having established a service authorization for the user's service user account), the application can access data/results from the oauth flow. The application now generates a unique, time-limited, use-once identifier (having a 10 minute lifespan) and associates it with the oauth result (i.e. service data provided via the service authorization for the service user account).

Figure 4B:
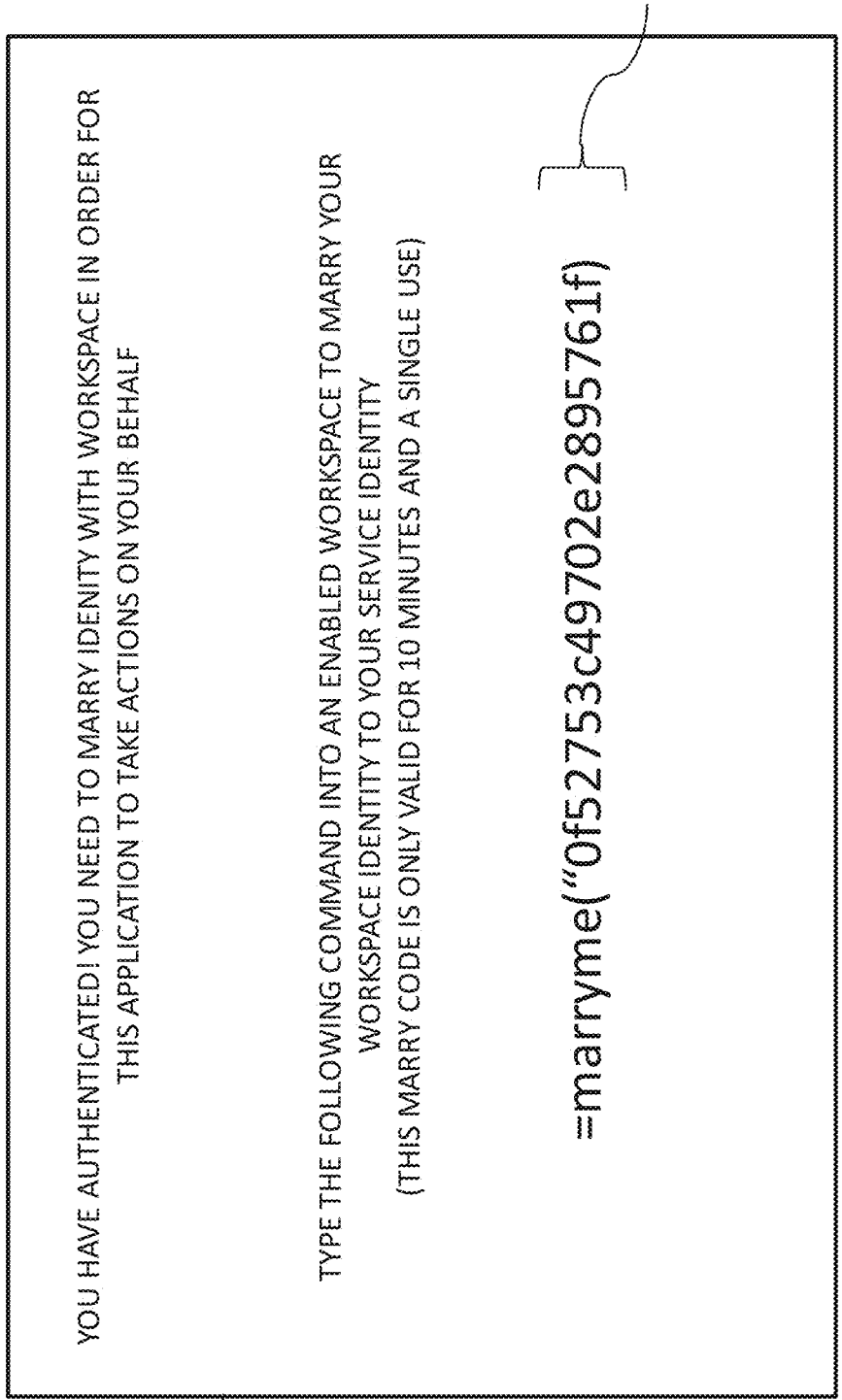

As illustrated in FIG. 4B, the identifier is presented to the user via the UI 400 in the form of an expression 410 that calls a 'marryme' function (with the identity as a parameter of the function).

The user copies the expression 410 from the UI, goes to the workspace client where he/she is logged in with his workspace user account and pastes it to any space enabled for the application.

The application executes the marryme function and identifies the oauth results associated with the identifier by searching for the marryme code. The application then determines the service authorization that the oauth results (i.e. service data) was provided via, and subsequently links the workspace user account running the marryme function to the user's service user account having the service authorization. Thus, the third party oauth authorization is linked with the workspace user account, allowing the user to call APIs and access functionality of the third party service.

Of course, the skilled person will appreciate that the above example, may be modified whilst still employing and/or providing similar aspects of the proposed concept(s).

Embodiments may comprise a computer system 70, which may form part of a networked system 7 illustrated in FIG. 4. The components of computer system/server 70 may include, but are not limited to, one or more processing arrangements, for example comprising processors or processing units 71, a system memory 74, and a bus 90 that couples various system components including system memory 74 to processing unit 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 typically includes a variety of computer system readable media. Such media may be any available media that is accessible by computer system/server 70, and it includes both volatile and non-volatile media, removable and non-removable media.

System memory 74 can include computer system readable media in the form of volatile memory, such as random access memory (RAM) 75 and/or cache memory 76. Computer system/server 70 may further include other removable/non-removable, volatile/non-volatile computer system storage media. By way of example only, storage system 74 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the invention.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the invention as described herein. #

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

In the context of the present application, where embodiments of the present invention constitute a method, it should be understood that such a method is a process for execution by a computer, i.e. is a computer-implementable method. The steps of the method therefore reflect various parts of a computer program, e.g. parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for associating an enterprise workspace user account with a service user account of a service, the method comprising the steps of:
   associating an identifier with service data provided by the service to the enterprise workspace, the service data being provided via a service authorization for a service user account;
   providing the identifier to a user associated with the enterprise workspace user account; and
   responsive to the enterprise workspace user account executing a predetermined function with the identifier as a parameter of the function: identifying the service data associated with the identifier; determining the service authorization the service data was provided via; and associating the enterprise workspace user account with the service user account that the service authorization is for.

2. The method of claim 1, further comprising the preceding step of:
   establishing a service authorization for a service user account, the service authorization being configured to authorize the enterprise workspace to access data of the service for the service user account.

3. The method of claim 2, wherein establishing a service authorization for a service user account comprises:
   defining an oauth profile for the service user account; and
   based on the oauth profile, defining a service authorization that is configured to authorize the enterprise workspace to access data of the service for the service user account.

4. The method of claim 1, wherein the identifier is configured to only be valid for a predetermined time period.

5. The method of claim 4, further comprising,
   responsive to the identifier not being used in the predetermined function within the predetermined time period: disassociating the identifier with the service data; associating a second, different identifier with the service data; and providing the second identifier to the user associated with the enterprise workspace user account.

6. The method of claim 1, wherein the identifier is configured to be valid for only a single use as a parameter of the predetermined function.

7. The method of claim 1, wherein the predetermined function comprises a registration function configured to receive an identifier as a parameter and, responsive to being executed by an enterprise workspace user account, to associate the enterprise workspace user account with a service user account based on an identifier received as a parameter.

8. The method of claim 1, wherein the service comprises a service of a network service platform accessible via the Internet.

9. A computer program product comprising a computer readable storage medium having program instructions embodied therewith, the program instructions executable by a processing unit to cause the processing unit to perform, when run on a computer network, a method for associating an enterprise workspace user account with a service user account of a service comprising the steps of:
   associating an identifier with service data provided by the service to the enterprise workspace, the service data being provided via a service authorization for a service user account;
   providing the identifier to a user associated with the enterprise workspace user account; and
   responsive to the enterprise workspace user account executing a predetermined function with the identifier as a parameter of the function: identifying the service data associated with the identifier; determining the service authorization the service data was provided via; and associating the enterprise workspace user account with the service user account that the service authorization is for.

10. A system comprising:
    a processor; and
    a computer readable storage medium having program instructions embodied therewith, the program instructions executable by the processor to cause the processor to perform, when run on a computer network, a method for associating an enterprise workspace user account with a service user account of a service comprising the steps of:
    associating an identifier with service data provided by the service to the enterprise workspace, the service data being provided via a service authorization for a service user account;
    providing the identifier to a user associated with the enterprise workspace user account; and
    responsive to the enterprise workspace user account executing a predetermined function with the identifier as a parameter of the function: identifying the service data associated with the identifier; determining the service authorization the service data was provided via; and associating the enterprise workspace user account with the service user account that the service authorization is for.

11. The system of claim 10, further comprising establishing a service authorization for a service user account, the service authorization being configured to authorize the enterprise workspace to access data of the service for the service user account.

12. The system of claim 11, further comprising:
    defining an oauth profile for the service user account; and
    based on the oauth profile, defining a service authorization that is configured to authorize the enterprise workspace to access data of the service for the service user account.

13. The system of claim 11, wherein the identifier is configured to be valid for only a single use as a parameter of the predetermined function.

14. The system of claim 11, wherein the predetermined function comprises a registration function configured to receive an identifier as a parameter and, responsive to being executed by an enterprise workspace user account, to associate the enterprise workspace user account with a service user account based on an identifier received as a parameter.

15. The system of claim 11, wherein the service comprises a service of a network service platform accessible via the Internet.

16. The system of claim 10, wherein the identifier is configured to only be valid for a predetermined time period.

17. The system of claim 16, further comprising: responsive to the identifier not being used in the predetermined function within the predetermined time period: disassociating the identifier with the service data; and associating a second, different identifier with the service data, and
    providing the second identifier to the user associated with the enterprise workspace user account.

* * * * *